J. D. Davis.
Sad Iron Holder.
N° 93,421. Patented Aug. 10, 1869.

Witnesses:
Hinchman
Wm. F. Clark

Inventor:
J. D. Davis
per Munn & Co.
Attys.

United States Patent Office.

JAMES D. DAVIES, OF EAST NEW YORK, N. Y.

Letters Patent No. 93,421, dated August 10, 1869.

IMPROVEMENT IN SAD-IRON POLISHER AND GLOSSER.

The Schedule referred to in these Letters Patent and making part of the same

*To all whom it may concern:*

Be it known that I, JAMES D. DAVIES, of East New York, Kings county, New York, have invented a new and improved Smoothing-Iron Polisher and Glosser; and I do hereby declare that the following is a full, clear, and exact description thereof, which will enable others skilled in the art to make and use the same, reference being had to the accompanying drawings, forming a part of this specification.

The object of this invention is to provide a simple and convenient implement for polishing sad-irons, to remove the starch which sometimes adheres to the faces thereof when ironing, and also to lubricate the same with a substance which will cause the iron to impart a glossy surface to the starched clothes, as hereinafter more fully specified.

Figure 1:
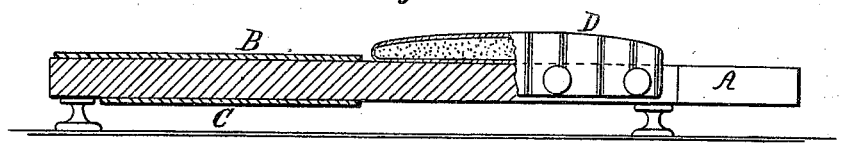
Figure 2:
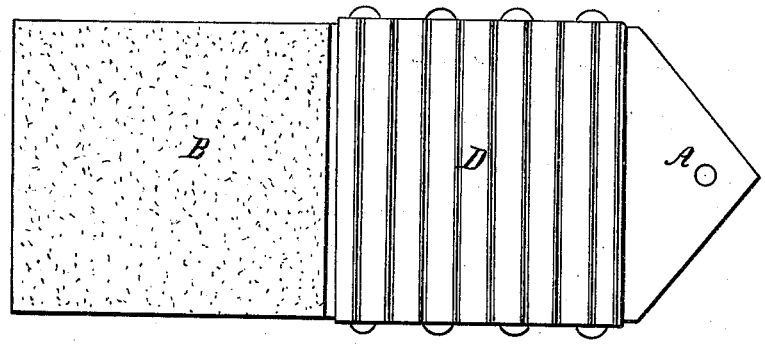

Figure 1 represents an elevation, partly in section, of my improved implement, and Figure 2 represents a plan view of the same.

Similar letters of reference indicate corresponding parts.

A represents a block of wood, or other substance, preferably set on short legs, whereon, at B and C, I provide polishing-surfaces of 'mery or other similar polishing-substance, which I cause to adhere thereto in any suitable manner; and at D, I place a sack of spermaceti, lard, or other similar substance, the said sack being so connected as to be readily opened for replenishing, when required.

This device furnishes a convenient implement for the ironing-table, whereon the irons may be quickly polished, and the surfaces, when roughened, burnt, or gummed with starch; and whereon also, by passing the irons over the sack containing the spermaceti, waxed surfaces may be imparted to them, rendering them capable of giving a high gloss to the clothes.

Having thus described my invention,

What I claim as new, and desire to secure by Letters Patent, is—

The improved polishing and glossing-implement A, provided with the polishing-surfaces B and C, and the glossing sack for holding spermaceti or other similar substance, all substantially as specified.

The above specification of my invention signed by me, this 5th day of April, 1869.

JAMES D. DAVIES.

Witnesses:
FRANK BLOCKLEY,
ALEX. F. ROBERTS.